United States Patent
Natividad

[19]
[11] Patent Number: 5,265,912
[45] Date of Patent: Nov. 30, 1993

[54] TOY TRAIN APPARATUS

[76] Inventor: Jeffrey A. Natividad, 1925 S. Holly Ave., Ontario, Calif. 91762

[21] Appl. No.: 962,910
[22] Filed: Oct. 19, 1992
[51] Int. Cl.⁵ ............................................... B62D 61/08
[52] U.S. Cl. ...................................... 280/828; 280/62; 296/177
[58] Field of Search ............... 280/828, 827, 200, 408, 280/62; 446/467; 296/177

[56] References Cited

U.S. PATENT DOCUMENTS

| | | | |
|---|---|---|---|
| 672,620 | 4/1901 | Horton | 280/828 |
| 696,315 | 3/1902 | Cooper | 280/828 |
| 3,804,427 | 4/1974 | Lohr et al. | 280/828 |
| 4,361,338 | 11/1982 | Kuchenbecker et al. | 296/177 |
| 4,417,523 | 11/1983 | Mariol | 280/827 |
| 4,909,538 | 3/1990 | Langton | 280/62 |

FOREIGN PATENT DOCUMENTS

965005  8/1950  France ................................. 280/62

Primary Examiner—Margaret A. Focarino
Assistant Examiner—Kevin Hurley
Attorney, Agent, or Firm—Leon Gilden

[57] ABSTRACT

A train apparatus includes a locomotive housing arranged for manual propulsion and for selective coupling to one of a first, second, and third cart assembly, wherein the first cart assembly includes amusement devices for motor skills, the second cart assembly includes various components relative to a simulation health emergency vehicle, and wherein the third cart assembly includes components relative to a kitchen assembly, and wherein the locomotive housing includes various selective bell, whistle, and audible signals operative relative to a passenger cockpit slot.

6 Claims, 6 Drawing Sheets

TOY TRAIN APPARATUS

BACKGROUND OF THE INVENTION

1. Field of the Invention

The field of invention relates to toy apparatus, and more particularly pertains to a new and improved toy train apparatus wherein the same is arranged for the amusement and entertainment of individuals, specifically children and the like.

2. Description of the Prior Art

Toy train apparatus of various types have been utilized in the prior art and exemplified in U.S. Pat. Nos. 3,802,121 and 4,393,620 wherein toy train apparatus is arranged for manual manipulation. The instant invention attempts to overcome deficiencies of the prior art, wherein the toy train apparatus is arranged for leg propulsion through the use of a tricycle type structure and is selectively coupled to one or all of a plurality of carts to accommodate various amusement modes in utilization of the apparatus and in this respect, the present invention substantially fulfills this need.

SUMMARY OF THE INVENTION

In view of the foregoing disadvantages inherent in the known types of toy train apparatus now present in the prior art, the present invention provides a toy train apparatus wherein the same utilizes a toy train apparatus arranged for manual propulsion in operative coupling to a plurality of carts for various modes of entertainment. As such, the general purpose of the present invention, which will be described subsequently in greater detail, is to provide a new and improved toy train apparatus which has all the advantages of the prior art toy train apparatus and none of the disadvantages.

To attain this, the present invention provides a train apparatus including a locomotive housing arranged for manual propulsion and for selective coupling to one of a first, second, and third cart assembly, wherein the first cart assembly includes amusement devices for motor skills, the second cart assembly includes various components relative to a simulation health emergency vehicle, and wherein the third cart assembly includes components relative to a kitchen assembly, and wherein the locomotive housing includes various selective bell, whistle, and audible signals operative relative to a passenger cockpit slot.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toy train apparatus which has all the advantages of the prior art toy train apparatus and none of the disadvantages.

It is another object of the present invention to provide a new and improved toy train apparatus which may be easily and efficiently manufactured and marketed.

It is a further object of the present invention to provide a new and improved toy train apparatus which is of a durable and reliable construction.

An even further object of the present invention is to provide a new and improved toy train apparatus which is susceptible of a low cost of manufacture with regard to both materials and labor, and which accordingly is then susceptible of low prices of sale to the consuming public, thereby making such toy train apparatus economically available to the buying public.

Still yet another object of the present invention is to provide a new and improved toy train apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 to 11 thereof, a new and improved toy train apparatus embodying the principles and concepts of the present invention and generally designated by the reference numeral 10 will be described.

Figure 1:
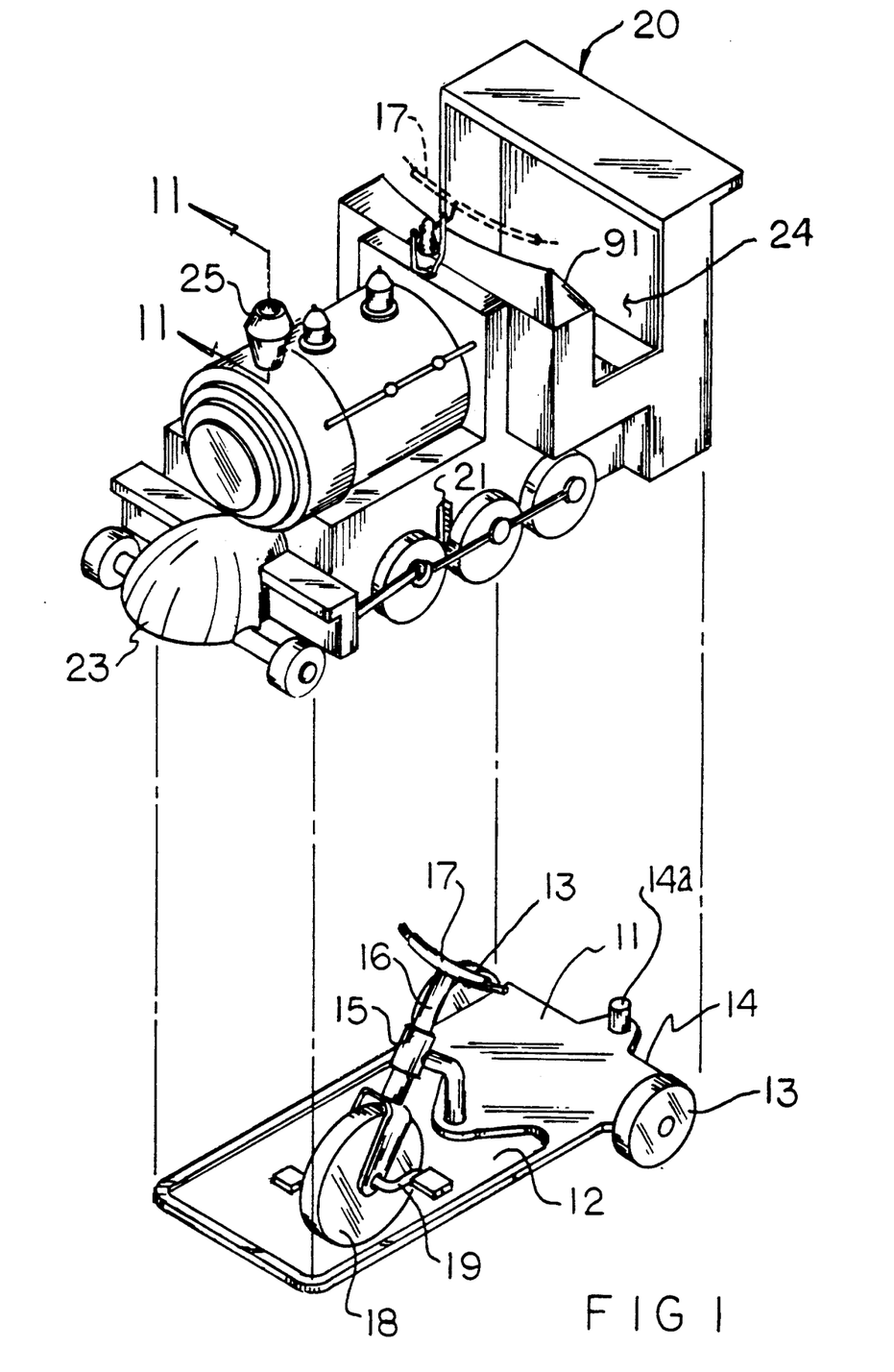
FIG. 1 is an isometric illustration, in an exploded view, of the locomotive housing of the invention.

More specifically, the toy train apparatus 10 of the instant invention essentially comprises a locomotive housing 20 arranged for mounting fixedly to a locomotive base plate 11. The base plate 11 is formed with a base plate opening 12, having a drive wheel member 18 directed therethrough. A yoke member 15 is mounted to the base plate 11 and extends over the base plate opening 12 rotatably mounting a shaft 16, having a handlebar 17 at its upper distal end and a drive wheel member 18 rotatably mounted within a bifurcated mount at its lower distal end. A crank assembly 12 is directed through the wheel member 18 in an orthogonal orientation, with the crank assembly 19 directed through the locomotive housing 20, and more specifically through locomotive housing side wall slots 21 to project the peddle members mounted onto the crank assembly 19 exteriorly of the locomotive housing side walls. The base plate includes a plurality of base plate rear wheels coaxially aligned relative to one another and rotatably mounted to opposed sides of the base plate 11 adjacent the base plate rear end 14. A coupling rod 14a is arranged for projection rearwardly of the rear end 14 for mounting various cart members of the invention, to be described in more detail below.

Figure 11:
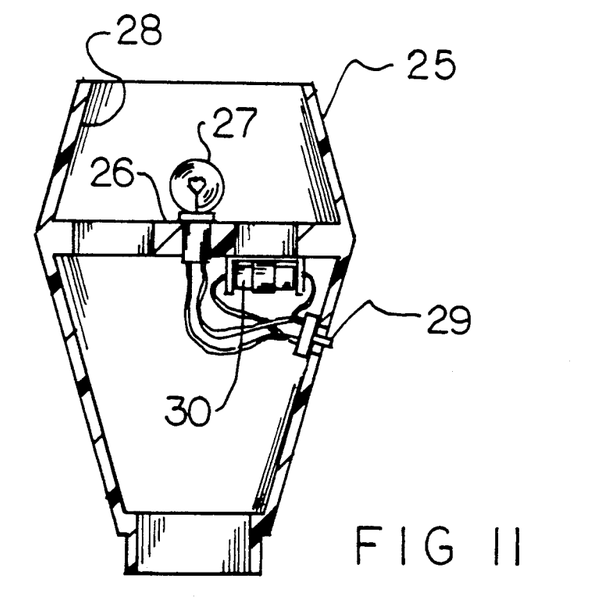
FIG. 11 is an orthographic view, taken along the lines 11—11 of FIG. 1 in the direction indicated by the arrows.

The locomotive housing 20 is arranged to include a resilient nose 23 projecting forwardly beyond the housing to accommodate impact to the housing and minimize injury to an individual positioned within the locomotive housing 20. A seat cockpit slot 24 is directed into the locomotive housing, as indicated in FIG. 11, and includes a dashboard 91 positioned beyond the handlebar 17 projecting within the cockpit slot 24. The dashboard 91 includes a plurality of simulation instrument gauges 92 to include engine temperature, a speedometer, steam pressure indicator, and fuel reserve indicator. Slide levers 93 are slidably mounted within respective slide lever slots 94 to simulate brake levers for use with the organization for the entertainment and amusement of a child positioned within the cockpit slot 24. A simulation telephone 95 may also be provided as desired for positioning within the cockpit slot for use by a child. A dashboard speaker and amplifier 96 is mounted within the dashboard 91 and projects rearwardly thereof (see FIG. 10), wherein a respective first, second, and third audio actuator button 97, 98, and 99 are provided to actuate respective first, second, and third tape decks 100, 101, and 102 selectively operative through each respective actuator button and directing amplified audio signals through the speaker amplifier structure 96 to simulate a respective bell, a whistle, and an "all-aboard" call by the various respective first, second, and third tape decks 100, 101, and 102.

The locomotive housing is further provided with a locomotive housing chimney stack 25, wherein as indicated in FIG. 11, includes a stack floor plate 26 positioned below an upper distal end of the chimney stack 25, with an illumination bulb 27 mounted within the floor plate, and a mirrored interior wall chamber 28 positioned above the floor plate 26 and the upper distal end of the stack 25 for reflection from the illumination bulb to enhance illumination projected therefrom to simulate a steam engine fire within the housing 20. To this end, an on/off switch 29 operative through a battery member 30 effects selective illumination of the illumination bulb 27, with the on/off switch 29 mounted through a rear wall of the stack 25 for ease of access to an individual positioned within the cockpit slot 24.

Figures 2, 3:
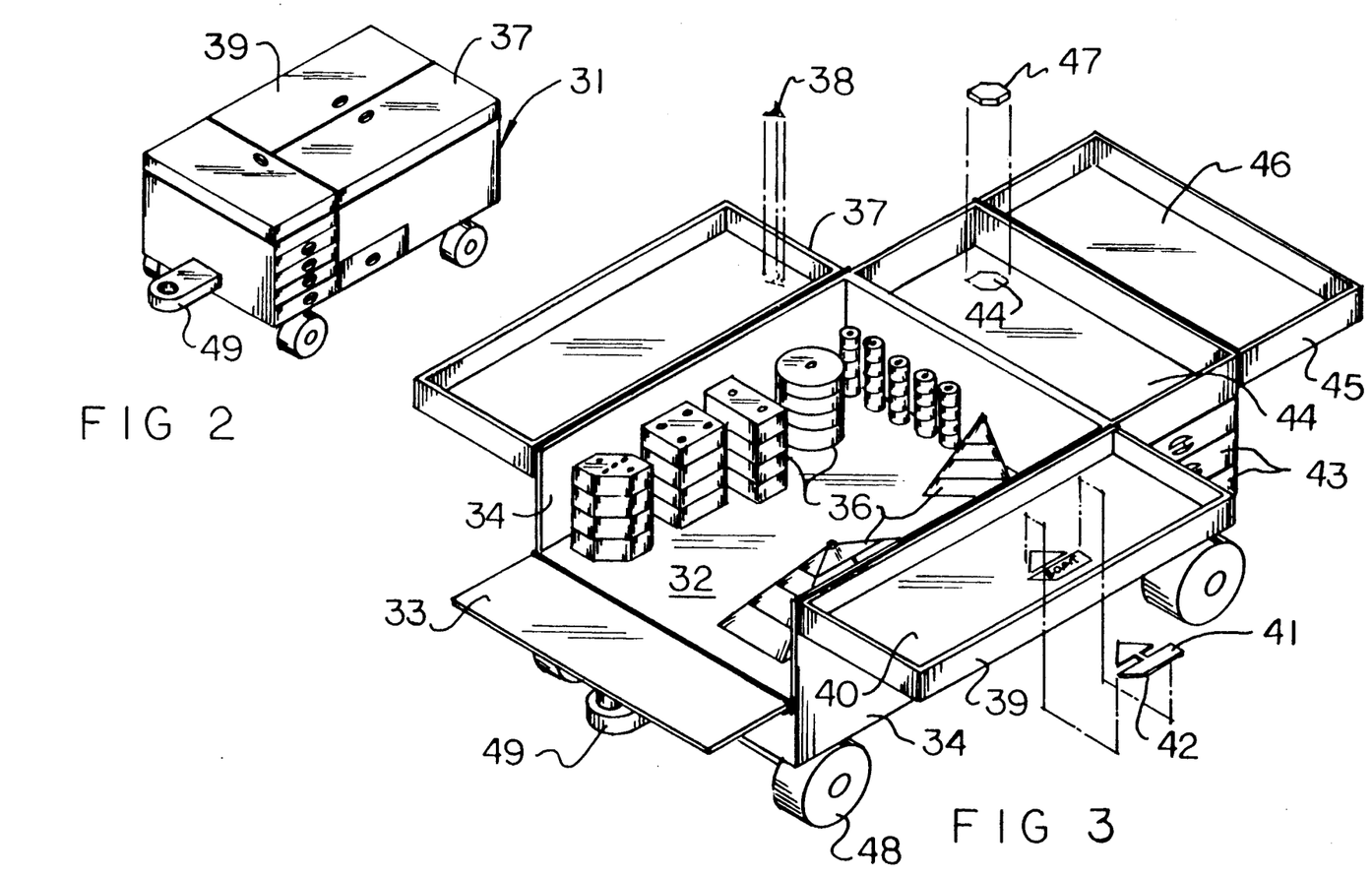
FIG. 2 is an isometric illustration of the first cart member.
FIG. 3 is an isometric illustration of the first cart member in an opened orientation.

A first cart structure 31, as indicated in the FIGS. 2 and 3, includes a first cart base plate 32 having a pivotally mounted front door plate 33 providing access between spaced first cart fixed side walls 34 and a first end wall 35 for access to various groups of building block stacks 36 for entertainment of children. A first metallic door plate 37 hingedly mounted to one of the side walls 34 is coextensive with the side wall 34 and includes various magnetic letters and digits indicated by the FIG. 38 for adherence to an interior surface of the first door plate 37. A second door plate 39 includes a hook and loop fastener surface 40 coextensive with an interior surface thereof for adherence to various identification members 41 of various configurations, each having a second hook and loop fastener surface 42 mounted to a bottom surface thereof for selective securement to the hook and loop fastener surface 40. Storage drawers 43 are provided directed into one of the side walls 34. A shelf plate 44 includes various geometrically configured cavities directed therewithin for receiving complementarily figured deformable polymeric inserts 47. A cupboard door 45 is provided having an erasure chalk board surface 46 within an interior surface thereof of the cupboard door 45. Various cart wheels 48 are provided for mobility of the first cart 31. Hitch mounting flanges 49 project beyond the forward and rear end portions of the first cart 31 for selective securement to the locomotive housing 20 and selectively to other of the second and third cart members 50 and 71 respectively.

Figures 4, 5:
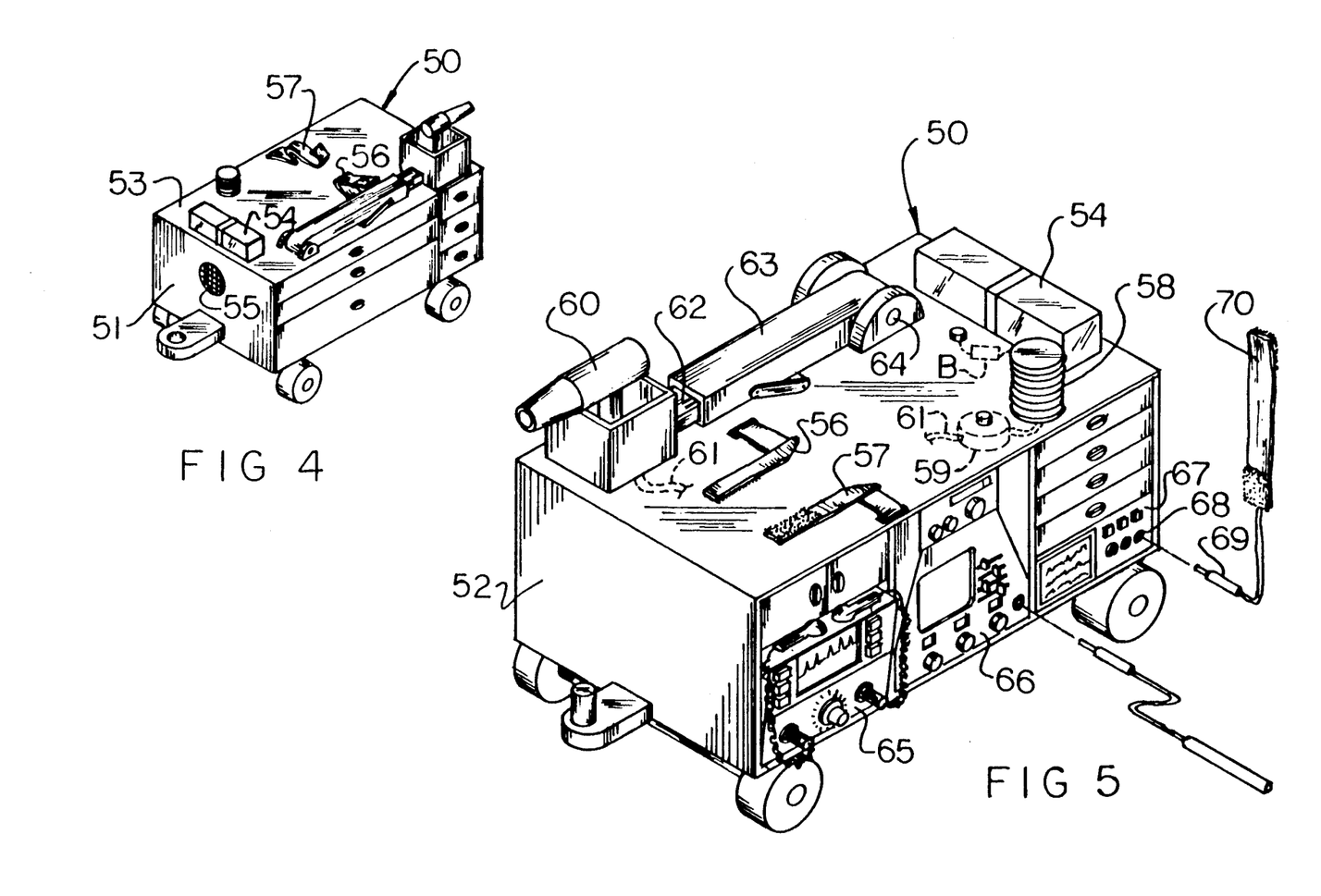
FIG. 4 is an isometric illustration of the second cart member.
FIG. 5 is an isometric illustration of the second cart member in an opposed side view relative to the FIG. 4.

A second cart 50 includes a second cart front wall spaced from a second cart rear wall, each having a second cart yoke structure for securement to the locomotive housing 20 and to other of the cart members. A second cart top wall 53 is provided, with a flasher unit 54 having an audio chip therewithin, and a siren speaker 55 directed through the second cart front wall 51. Actuation of an associated button member positioned in adjacency to the flasher unit effects actuation of the flasher and siren structure through the speaker 55, with a battery member "B", as indicated in FIG. 5, positioned within the second cart 50. A first and second strap 56 and 57 are mounted to the second cart top wall 53, with the first and second strap including respective first and second hook and loop fastener ends for securement relative to one another to secure various dolls, stuffed animals and the like to simulate a patient for use by the second cart structure 50 to simulate a health emergency unit. A plunger member 58 is provided operative to direct fluid from a fluid reservoir 59 through a delivery conduit 61 into an outlet member 60, that in turn is mounted to an outlet member support leg 62 telescopingly received within a sleeve 63 pivotally mounted about a pivot axle 64 to permit selective and limited elevation of the fluid outlet member 60. A simulation resuscitation member 65, a simulation monitor structure 66, and a simulation heart monitor 67 are directed into a side wall of the second cart 50. The heart monitor 67 includes heart monitor socket 68 receiving socket plugs 69, each socket plug having a socket plug strap 70 for wrapping about the aforenoted doll or stuffed toy (not shown) for the simulation monitoring of such a toy in use of the organization.

Figures 6, 7:
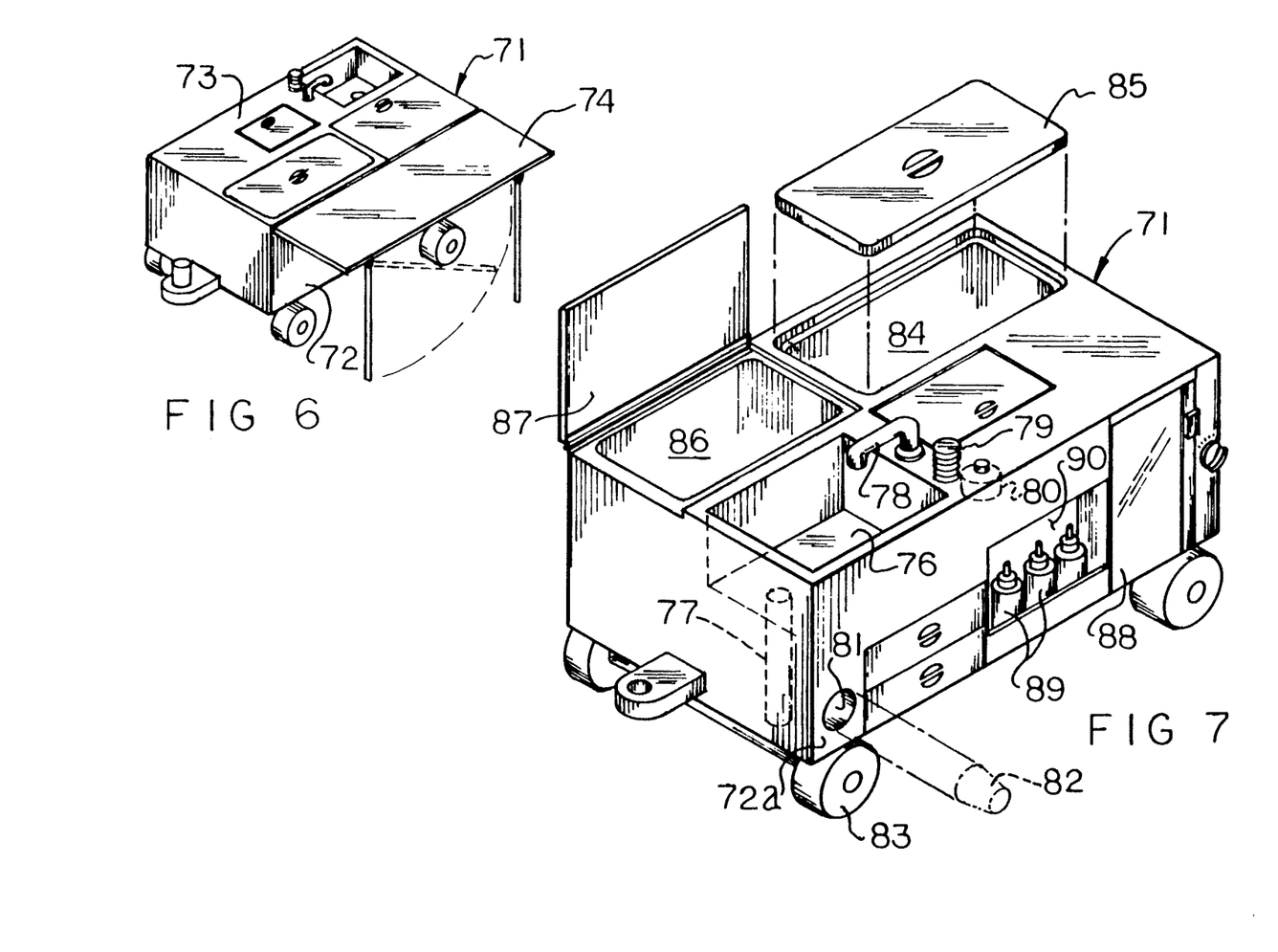
FIG. 6 is an isometric illustration of the third card member.
FIG. 7 is an isometric illustration of the third cart member in opposed side view relative to FIG. 6.
Figure 8:
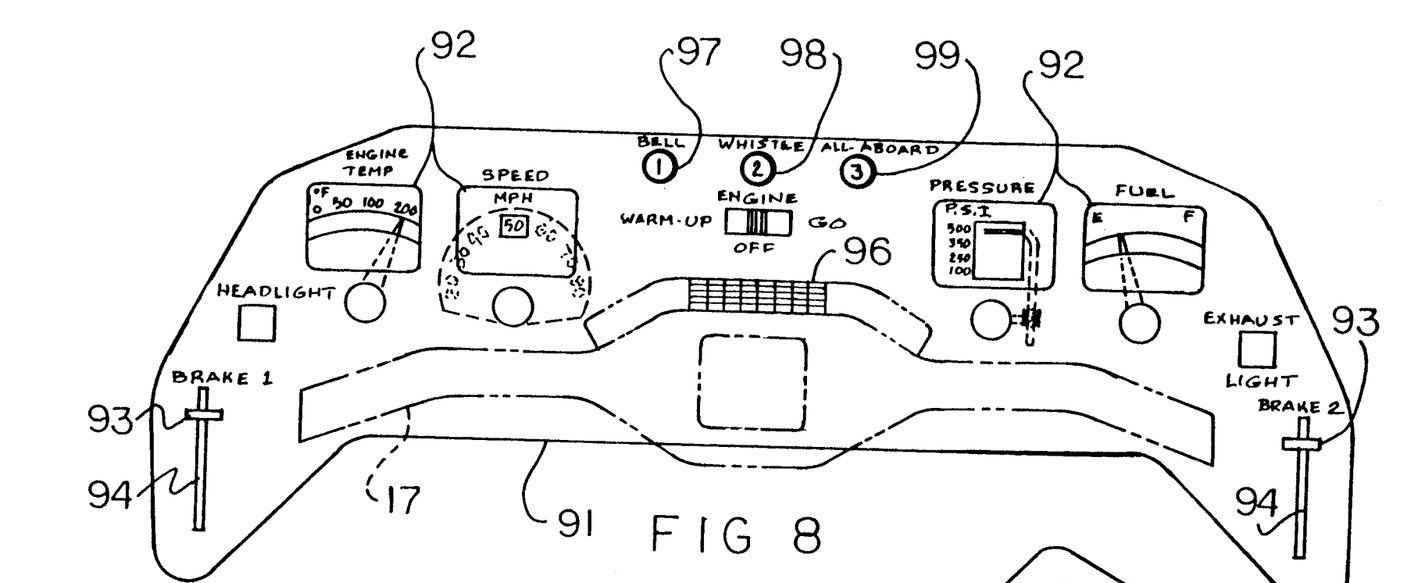
FIG. 8 is an orthographic view of the dashboard assembly of the passenger compartment of the locomotive housing.
Figure 9:
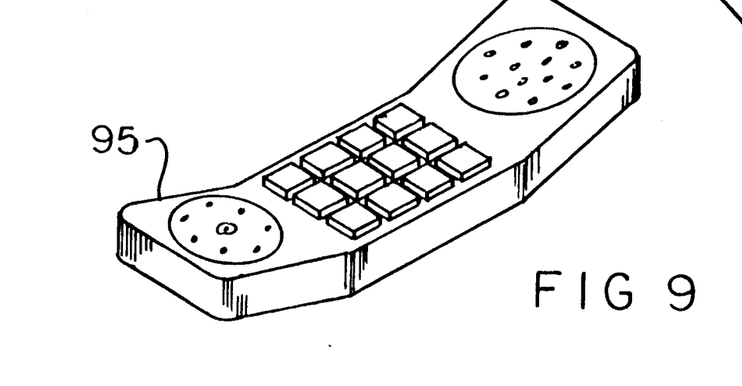
FIG. 9 is an isometric illustration of a proposed simulation toy telephone for use within the passenger compartment.
Figure 10:
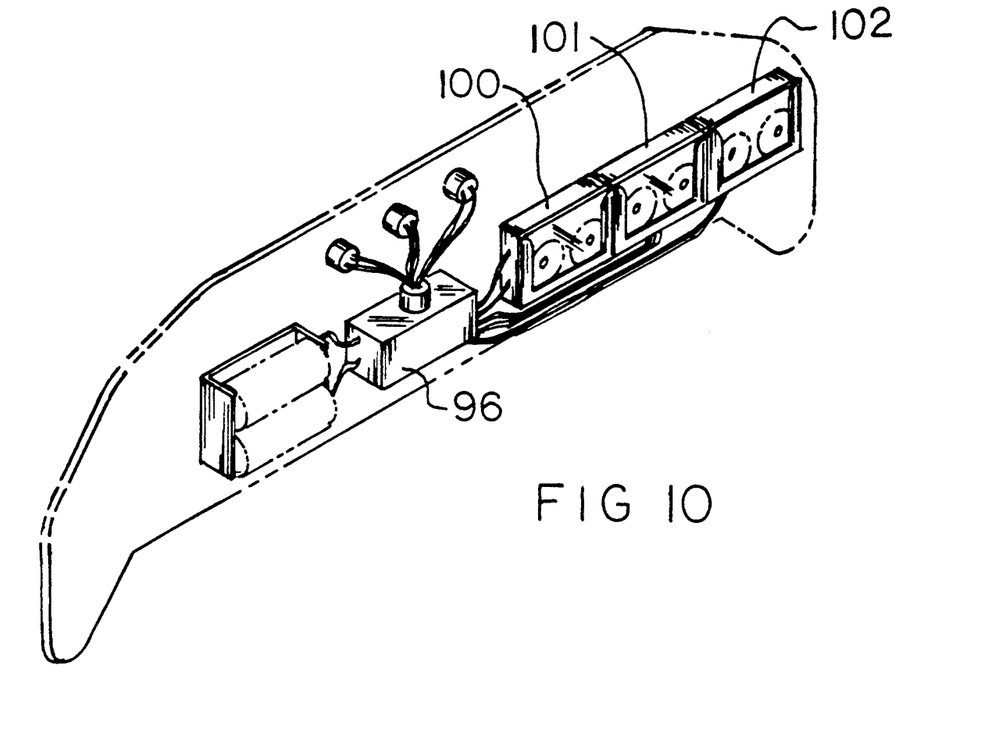
FIG. 10 is an orthographic rear view of the dashboard compartment of the invention, as indicated in FIG. 8.

The third cart 71 of the invention includes a kitchen simulation structure. The third cart 71 includes a third cart first side wall 72 and a third cart second side wall 72a. A top wall 73 is provided to include a sink cavity 76 directed therein, with the sink cavity including a drain conduit 77 directed from the sink cavity 76 through the floor of the third cart 71. A faucet 78 is provided in fluid communication with a faucet pump 79 that through a sink reservoir directs fluid from the water reservoir 80 through the faucet 78. A third cart table 74 is hingedly mounted to the third cart first side wall 72 at its intersection with the top wall 73.

A cup receiving cavity 81 is provided to receive at least one cup member 82 therewithin directed through the third cart second side wall 72a for removal and use in cooperation with the faucet 78. The third cart wheels 83 are provided for mobility of the third cart, wherein as in the first and second cart structure, peg assemblies project from the forward and rear walls of the third cart, as illustrated, for securement to the locomotive housing 20 or the other cart assemblies. A cooler cavity 84 having a cooler cavity lid 85 is directed through the top wall, as well as at least one storage cavity 86 having a storage cavity lid 87. An oven door 88 is directed through the second side wall 72a, as well as a condiment container cavity 90 mounting a plurality of condiment containers 89 therewithin, such as catsup, mustard, and the like in simulation construction.

In this manner, a child may employ various modes of entertainment employing various carts of the locomotive or utilization of the locomotive housing alone.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A toy train apparatus, comprising,
   a locomotive housing having a locomotive base plate, the base plate including a base plate opening directed therethrough, and
   the locomotive base plate having a rear end, with base plate side walls, and
   a rear wheel directed through each side wall in adjacency to the base plate rear end, and
   a yoke member mounted to the base plate extending over the opening, and
   a shaft rotatably mounted through the yoke member, the shaft having a shaft lower distal end, the lower distal end including a bifurcated mounting assembly, and the bifurcated mounting assembly rotatably mounting a wheel member therethrough, with the wheel member projecting through the base plate opening, and
   the shaft having a shaft upper distal end, and the shaft upper distal end including a handlebar, and
   the wheel member having a crank assembly coaxially directed through the wheel member, and
   the locomotive housing including locomotive housing side walls, and the crank member projecting through each side wall of said side walls, and
   the locomotive housing including a seat cockpit slot, and the seat cockpit slot including a dashboard, and
   the dashboard having the shaft and the handlebar projecting therethrough, and
   the base plate rear end including a rear end coupling.

2. An apparatus as set forth in claim 1 wherein the locomotive housing includes a locomotive housing chimney stack, the chimney stack including a floor plate positioned below an upper distal end of the chimney stack, with an illumination bulb mounted within the floor plate, and a mirrored interior wall chamber oriented between the floor plate and the chimney stack upper distal end, and an on/off switch directed through the chimney stack in electrical communication with a battery member and the illumination bulb for selective illumination of the illumination bulb within the mirrored chamber.

3. An apparatus as set forth in claim 2 wherein the dashboard includes a plurality of simulation gauges, and further includes a dashboard speaker and amplifier, and a first audio actuator button, a second audio actuator button, and a third audio actuation button arranged in respective communication with a respective first tape deck, a second tape deck, and a third tape deck to direct an audio signal from one of said first tape deck, second tape deck, and third tape deck through the dashboard speaker and amplifier upon selective actuation of said first audio actuator button, said second audio actuator button, and said third audio actuator button.

4. An apparatus as set forth in claim 3 including a first cart, wherein the first cart includes a first cart base plate, the first cart base plate having a front door plate pivotally mounted to the first cart base plate at a forward end of the first cart base plate, and first cart spaced side walls, and a first cart first end wall spaced from the front door plate, and a plurality of building block groups positioned between the front door plate and the first end wall on the base plate, and a first metallic door plate having at least one magnetically adherable member securable to the first metallic door plate to an interior surface thereof, and a second door plate, with the first door plate pivotally mounted to one of said first cart side walls, and the second door plate mounted to a further one of said first cart side walls, the second door plate having a hook and loop fastener surface, and at least one identification member having a second hook and loop fastener surface selectively securable to the first hook and loop fastener surface, and a shelf plate, and a second end wall positioned in a spaced relationship relative to the first end wall, and the shelf plate having at least one cavity therewithin, and deformable polymeric member received within said at least one cavity, and a cover door pivotally mounted to the second end wall, and the cover door having a cover door interior surface, and the cover door interior surface having an erasable chalk board surface thereon, the first cart having first cart wheels, and the first cart having at least one first cart mounting member for securement to the locomotive housing.

5. An apparatus as set forth in claim 4 including a second cart, with the second cart including a second cart top wall, and a second cart base plate, the second cart base plate having a plurality of second cart wheels, and second cart mounting means for securement selectively to the first cart and to the locomotive housing, and the second cart top wall having a flasher unit and audio means for selective actuation of the flasher unit and the audio means, and a first strap and a second strap mounted to the second cart top wall, with the first strap including a first strap hook and loop fastener surface, and the second strap having a second strap hook and loop fastener surface to permit securement of the first strap to the second strap for securing a simulation victim therewithin, and a plunger member mounted to the second cart top wall, and a fluid reservoir positioned within the second cart in fluid communication with the plunger member, and an outlet member in communication with the fluid reservoir and the plunger member, whereupon compression of the plunger member effects projection of fluid from the fluid reservoir through the outlet member, and the outlet member having an outlet member support leg, and a sleeve, with the outlet member support leg telescopingly received within the sleeve, and the sleeve having a pivot axle mounted to the top wall to permit pivoting of the sleeve relative to the top wall.

6. An apparatus as set forth in claim 5 including a third cart, wherein the third cart includes a third cart base plate, the third cart base plate having third cart base plate mounting means for securement selectively to the first cart, the second cart, and selectively to the locomotive housing, the third cart having a third cart top wall, the third cart top wall having a sink cavity, the sink cavity including a drain conduit directed from the sink cavity through the third cart base plate, and a faucet mounted over the sink cavity, and a sink water reservoir mounted within the third cart, and a pump member to selectively project fluid through the sink water reservoir and the faucet, and a cup receiving cavity directed into the cart having at least one cup member therewithin removably mounted relative to the cup receiving cavity, and third cart wheels mounted to the third cart base plate for permitting mobility of the third cart.

* * * * *